United States Patent [19]

Gotch

[11] Patent Number: 4,603,838
[45] Date of Patent: Aug. 5, 1986

[54] BALL VALVE SEAT

[75] Inventor: H. Gotch, Sunbury, United Kingdom

[73] Assignee: Grundy (Teddington) Limited, Middlesex, England

[21] Appl. No.: 765,250

[22] Filed: Aug. 13, 1985

[30] Foreign Application Priority Data

Aug. 13, 1984 [GB] United Kingdom ............... 8420518

[51] Int. Cl.⁴ .................... F16K 39/00; F16L 55/18
[52] U.S. Cl. .................................. 251/361; 251/339; 251/363; 137/322
[58] Field of Search ............... 251/339, 360, 361, 363; 137/322

[56] References Cited

U.S. PATENT DOCUMENTS

| | | | |
|---|---|---|---|
| 1,493,784 | 5/1924 | Larson | 251/363 |
| 1,518,775 | 12/1924 | Cordley et al. | 251/361 |
| 1,624,234 | 4/1927 | Hale | 251/363 |
| 2,729,237 | 1/1956 | Hite | 251/361 |
| 2,769,454 | 11/1956 | Bletcher et al. | 251/361 |
| 3,918,681 | 11/1975 | Eberhardt | 251/363 |
| 4,343,325 | 2/1986 | Fallon | 137/322 |
| 4,482,129 | 11/1984 | Baker et al. | 251/361 |

FOREIGN PATENT DOCUMENTS 913391  9/1946  France ............................. 251/360

Primary Examiner—A. Michael Chambers
Attorney, Agent, or Firm—Thomas I. Rozsa; Kenneth W. Iles

[57] ABSTRACT

A ball valve seat is provided which comprises two separate reinforcement members, preferably of metal, embedded in an annular resilient body. The interior of the resilient body defines at one end a part-hemispherical ball valve seat and at its other end, of greater wall thickness, an outlet controlled by the ball valve. One of the reinforcing members has a flared skirt extending into the narrower wall thickness end of the resilient body and a narrower neck located in the wider wall thickness end of the resilient body, where it is received in an annular groove in the second reinforcement member. A portion of the second reinforcement member extends within the wider wall thickness end of the resilient body radially of the first reinforcement member over its skirt portion.

9 Claims, 3 Drawing Figures

BALL VALVE SEAT

BACKGROUND OF THE INVENTION

1. Field of the Invention

In general, beverages such as beer are placed in containers, such as casks, which have as part of their assembly an extractor tube which extends from the outlet to adjacent the bottom of the cask. A well known apparatus for controlling the removal of liquid through such an extractor tube is a ball valve which cooperates with a valve seat. The present invention relates to an improved valve seat which incorporates all of the valuable features of valve seats known in the prior art but affords the additional significant advantage of being easier, quicker and therefore cheaper to produce, thereby resulting in substantial savings.

2. Description of the Prior Art

Ball valve seats which are known in the prior art generally comprise an annular body of resilient material which is reinforced internally by a unitary metal insert. This metal insert has a relatively complex shape and is ordinarily manufactured by a painstaking machining operation. The unitary metal insert is customarily machined from a single blank. Due to the extensive machining operation, the manufacturing process is time consuming and very expensive, thereby resulting in a high cost for such a ball valve seat.

There is no presently known apparatus for providing a simple, inexpensive metal insert to reinforce the resilient material such as rubber for a valve seat.

SUMMARY OF THE PRESENT INVENTION

The present invention comprises several alternative embodiments which in general embody the same concept of providing a simle, inexpensive reinforcing insert which is used to reinforce the resilient portion of a valve seat.

One embodiment of the present invention includes a reinforcing insert which comprises two separate annular reinforcement components. The first annular reinforcement component has a skirt portion and a relatively narrower-diameter neck portion. The second reinforcement component is in the form of a ring having in the region of its inner periphery a groove to accept the neck portion of the first annular reinforcement component. An annular reinforcement body serves to maintain the two reinforcement components in a predetermined relationship such that the second annular reinforcement component extends radially outward of the first annular reinforcement component over the outer periphery of its skirt portion. In the preferred embodiment, the first and second reinforcement components are each made of metal and can be manufactured by a conventional pressing or deep drawing operation.

A second embodiment of the present invention ball valve seat also incorporates a first annular reinforcement member and a second annular reinforcement member as described above. In this embodiment, the two metal reinforcement members are embedded in the resilient annular body by a molding operation. The resilient annular body has a wide wall thickness at one axial end and a narrow wall thickness at its opposite axial end. The inner periphery of the resilient annular body tapers concavely between the wider and narrower axial ends to provide a part-hemispherical seat for a ball valve. With this design for the resilient annular body, the first metal reinforcement member comprises a flared skirt extending into the narrow end of the resilient body and a narrow neck portion which extends into the wider end of the resilient body. The second annular reinforcement member is located in the wider end of the resilient body and comprises a ring which is substantially U-shaped in radial cross-section; the U comprises two limbs joined by a web with the web extending toward the radially outer periphery of the skirt of the first annular reinforcement member. The second annular reinforcement member further comprises a flange extending radially inwardly from the free end of the radially inner limb of the U, with the flange having the form of an annular channel in inverted relation to the U. The neck of the first annular reinforcement member is inserted into the flange of the second annular reinforcement member.

In a third embodiment of the present invention, the first annular reinforcement member of the ball valve seat has a flared skirt portion and a narrower-diameter neck portion so that the neck portion is received in an annular channel of the second annular reinforcement member. The second annular reinforcement member comprises on the radially outer side of the channel a portion which is substantially U-shaped in radial cross-section and is further in inverted relation to the channel. The U-shaped portion extends toward the outer periphery of the skirt of the first annular reinforcement member. The first and second reinforcement members are made of metal and are embedded in the annular body of resilient material (such as rubber) of the ball valve seat by a molding operation such that the molded body has opposite axial end proportions of wide and narrow wall thickness respectively. The second annular reinforcement member and the neck portion of the first annular reinforcement member are located in the wide end portion of the annular resilient body. The skirt of the first annular reinforcement member extends into the narrow end of the annular resilient body. The inner periphery of the annular resilient body defines in its narrow end portion a part-hemispherical ball valve seat.

It is an object of the present invention to provide a pair of annular reinforcement members for use in the resilient body portion of a ball valve seat which can be incorporated into the designs as set forth above and further can be produced from inexpensive metal through conventional mass production methods such as stamping, drawing, or pressing.

It is another object of the present invention to eliminate the need for producing a reinforcement member of one piece construction which must be made through costly hand machining operations.

Further novel features and other objects of the present invention will become apparent from the following detailed description, discussion and the appended claims taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Figures 1, 2, 3:
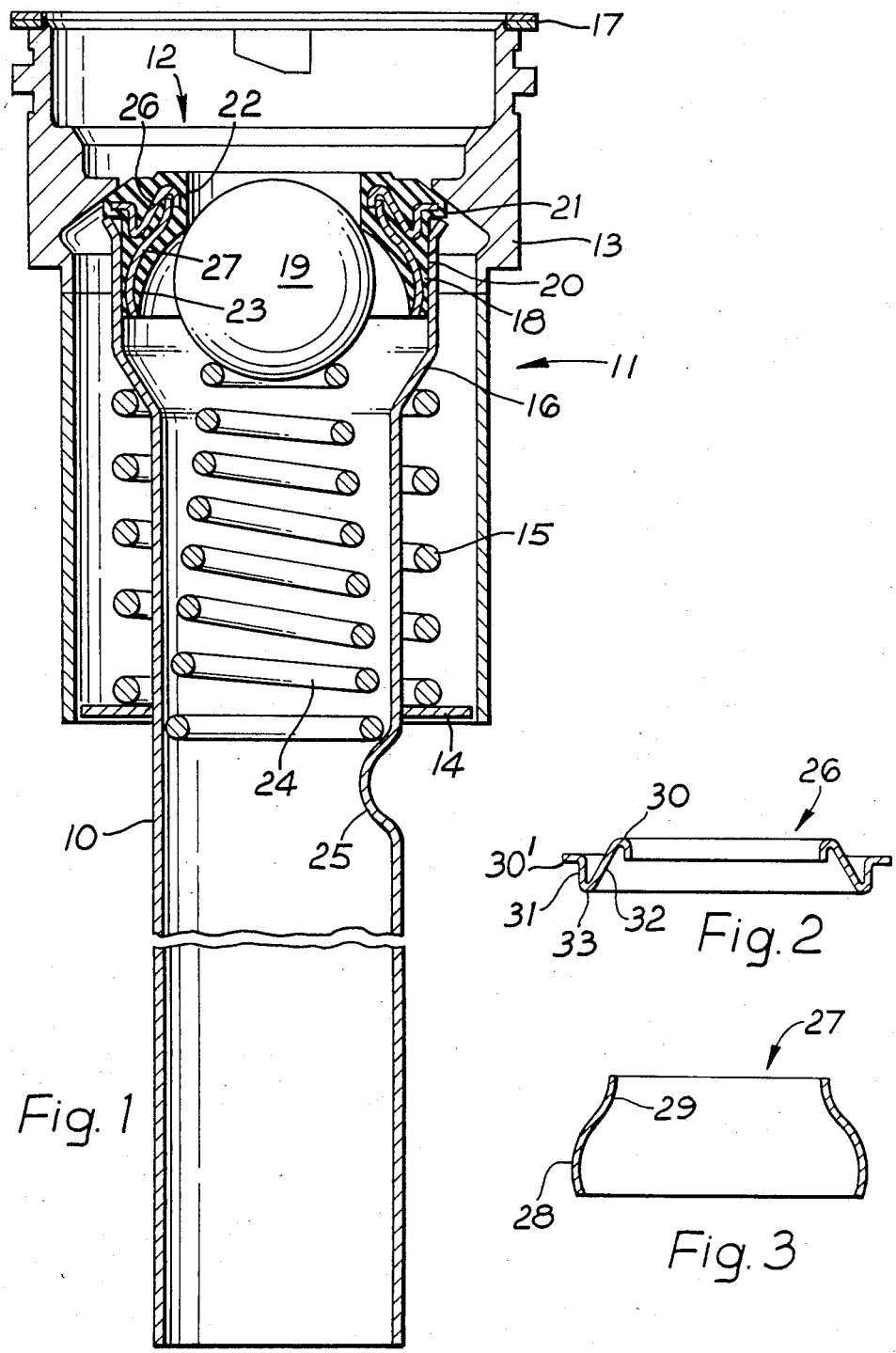
FIG. 1 is a cross-sectional view of the opening in a cask, further disclosing the extractor tube assembly which comprises therein a ball valve assembly for sealing the opening. The ball valve assembly further comprises one embodiment of the two piece reinforcement member of the present invention.
FIG. 2 is an enlarged view of the second annular reinforcement member as disclosed in FIG. 1.
FIG. 3 is an enlarged view of the first annular reinforcement member as disclosed in FIG. 1.

Although the apparatus of the present invention will now be described with reference to specific embodiments in the drawings, it should be understood that such embodiments are by way of example and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring particularly to FIG. 1, there is shown at 10 the outlet end of an extractor tube for a cask (not shown) which contains a beverage such as beer. In use, the tube extends from adjacent the bottom of the cask to a position where it may communicate with passageways (not shown) for liquid extraction over an end fitting 11 which is controlled by a valve assembly 12. The end fitting comprises a valve body assembly 12 provided with a circlip 17, a locking clip 14 surrounding the tube 10 and a main spring 15 between the locking clip 14 and a flared end portion 16 of the tube 10.

Within the flared end 16 of the extractor tube 10 is a ball valve seat 18 for ball valve 19. The valve seat 18, which is molded from rubber or another suitable resilient material, is annular and has a substantially cylindrical outer periphery 20 to fit within the flared end 16 of extractor tube 10. The valve seat 18 further has a shoulder 21 which engages over the end of tube 10, as shown in FIG. 1. The inner periphery of the valve seat body 18 has a cylindrical outlet end portion 22 and a part-hemispherical inner portion 23 serving to make line contact with the ball 19 when the ball valve is closed. The ball 19 is biased to the valve-closed position by a conical spring 24 which acts between the ball 19 and inward protrusions of the extractor tube 10, one of which is shown at 25.

The resilient valve seat body 18 is reinforced internally by two annular metal components 26 and 27 shown separately and on a larger scale in FIGS. 2 and 3, respectively. It is these two metal reinforcing components and their design which is the heart of the present invention. As set forth in the Summary of the Invention section, component 26 is the second annular reinforcement member and component 27 is the first annular reinforcement member. Each component, 26 and 27, can be separately made by a simple pressing, stamping, or deep drawing operation. As best illustrated in FIG. 3, the first annular reinforcement member 27 comprises a convexly-curved, outwardly flared skirt portion 28 which tapers upwardly to a narrower-diameter neck portion 29. As best illustrated in FIG. 2, the second annular reinforcement member 26 is a ring deformed generally to U-shape with flanges 30' and 30 extending respectively from the free ends of the limbs 31 and 32 of the "U", the limbs being joined at their other ends by a web 33 which, in use, extends over the outer periphery of the skirt 28 of first annular reinforcement member 27. This is best illustrated in FIG. 1. The radially inner flange 30 of second annular reinforcement member 26 is in the form of an annular channel inverted relative to the "U" formed of components 31, 33 and 32 respectively, and this is dimensioned to accept and locate over the neck portion 29 of the first annular reinforcement member 27, as best illustrated in FIG. 1.

To make the ball valve seat 18, first the metal first and second annular reinforcement members 27 and 26 are made by pressing, stamping, and/or deep drawing, and are then loosely assembled in the position shown in FIG. 1. Next, a resilient material is molded around the first and second annular reinforcement members 27 and 26 respectively, to provide a body 18 having the shape shown in FIG. 1 and in which the first and second reinforcement members are embedded. The second annular reinforcement member 26 and the neck 29 of the first annular reinforcement member 27 are located in the wider wall-thickness end of the body 18 with the flange 30' of the second annular reinforcement member 26 extending into the shoulder 21. The U-shaped configuration of the second annular reinforcement member 26 provides good keying of the second annular reinforcement member to the surrounding resilient material. The skirt portion 28 of the first annular reinforcement member 27 extends into the narrower wall-thickness end of the body 18.

Through use of the present invention, the ball valve seat 18 is given a metal reinforcement of quite complex shape but which requires no expensive machining to manufacture it. There need be no mechanical connection between the two reinforcement members 26 and 27 because the surrounding rubber or other resilient material will, after the molding operating, hold them in the relative position shown in FIG. 1.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A ball valve seat comprising:
   a. a first annular reinforcement member;
   b. a second annular reinforcement member;
   c. said first annular reinforcement member further comprising a skirt portion and a narrower-diameter neck portion;
   d. said second annular reinforcement member being in the form of a ring and having in the region of its inner periphery a groove to accept the neck portion of said first annular reinforcement member; and
   e. an annular resilient body serving to maintain said first annular reinforcement member and said second annular reinforcement member in a predetermined relationship with said second annular reinforcement member extending radially outward of the first annular reinforcement member over the outer periphery of its skirt portion.

2. The invention as defined in claim 1, wherein said first annular reinforcement member and said second annular reinforcement member is made of metal.

3. The invention as defined in claim 1, wherein said first annular reinforcement member and said second annular reinforcement member are each embedded in said resilient body.

4. The invention as defined in claim 1, wherein:
   a. said annular resilient body is of greater thickness at one end than its other end so as to comprise a wider end portion at one location and a narrower end portion at the opposite location of the annular resilient body;
   b. the inner periphery of said annular resilient body tapers concavely to provide a ball valve seat;
   c. said second annular reinforcement member and the neck portion of said first annular reinforcement member are located in the wider end portion of said annular resilient body; and
   d. said skirt portion of said first annular reinforcement member extends into the narrower end portion of said annular resilient body.

5. The invention as defined in claim 4, wherein said narrower end portion of said resilient body is part-hemispherical.

6. The invention as defined in claim 5, wherein said second annular reinforcement member is generally U-shaped in radial cross-section and said groove is located on the radially inner side of the "U" and in inverted relation thereto.

7. A ball valve seat comprising:
   a. a first annular reinforcement member;
   b. a second annular reinforcement member;
   c. said first annular reinforcement member further comprising a skirt portion and a narrower-diameter neck portion;
   d. said second annular reinforcement member being in the form of a ring and having in the region of its inner periphery a groove to accept the neck portion of said first annular reinforcement member;
   e. an annular resilient body serving to maintain said first annular reinforcement member and said second annular reinforcement member in a predetermined relationship with said second annular reinforcement member extending radially outward of the first annular reinforcement member over the outer periphery of its skirt portion;
   f. said first annular reinforcement member and said second annular reinforcement member each being embedded in said resilient body;
   g. said resilient body is molded onto and around said first annular reinforcement member and said second annular reinforcement member;
   h. said resilient body is of greater thickness at one end than its other end so as to comprise a wider end portion at one location and a narrower end portion at the opposite location of the resilient body;
   i. the inner periphery of said resilient body tapers concavely between said wider end portion and said narrower end portion to provide a part-hemispherical seat for a ball valve;
   j. said second annular reinforcement member and the neck portion of said first annular reinforcement member are located in the wider end portion of said resilient body;
   k. said skirt portion of said first annular reinforcement member extends into the narrower end portion of said resilient body; and
   l. said second annular reinforcement member comprising a ring which is generally U-shaped in radial cross-section, the U comprising two limbs joined by a web, the web extending toward the radially outer periphery of the skirt portion of said first annular reinforcement member, and a flange extending radially inwardly from the free end of the radially inner limb of the U, the flange having the form of an annular channel in inverted relation to the U and in which the neck portion of said first annular reinforcement member is received.

8. The invention as defined in claim 7 wherein said first annular reinforcement member and said second annular reinforcement member are each made of metal.

9. A method of manufacturing a ball valve seat comprising:
   a. locating a first annular metal reinforcement member which has a flared skirt portion and a narrower-diameter neck portion so that the neck portion is received in an annular channel of a second metal annular reinforcement member;
   b. said second annular metal reinforcement member having on its radially outer side of its channel a portion which is substantially U-shaped in radial cross-section and in inverted relation to the channel, the U-shaped portion extending toward the outer periphery of the skirt portion of said first annular metal reinforcement member;
   c. embedding said first and second annular metal reinforcement members in an annular body of resilient material by a molding operation such that the molded annular body has opposite axial end portions of wider and narrower wall thicknesses;
   d. said second metal annular reinforcement member and the neck portion of said first annular metal reinforcement member being located in the wider end portion of said molded annular body;
   e. the skirt portion of said first annular reinforcement member extending into the narrower end portion of said molded annular body; and
   f. the inner periphery of said molded annular body defining in its narrower end portion a part-hemispherical ball valve seat.

* * * * *